United States Patent
Campbell

(10) Patent No.: US 11,847,064 B2
(45) Date of Patent: Dec. 19, 2023

(54) BUFFER AND METHODS FOR ADDRESS TRANSLATIONS IN A PROCESSOR

(71) Applicant: International Business Machines Corporation, Armonk, NY (US)

(72) Inventor: David Campbell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/212,979

(22) Filed: Dec. 7, 2018

(65) Prior Publication Data

US 2020/0183856 A1 Jun. 11, 2020

(51) Int. Cl.
*G06F 12/1018* (2016.01)
*G06F 12/123* (2016.01)

(52) U.S. Cl.
CPC ........ *G06F 12/1018* (2013.01); *G06F 12/124* (2013.01); *G06F 2212/1044* (2013.01); *G06F 2212/657* (2013.01)

(58) Field of Classification Search
CPC .............. G06F 12/1018; G06F 12/124; G06F 2212/1044; G06F 2212/657
USPC ........................................................ 711/206
See application file for complete search history.

(56) References Cited

U.S. PATENT DOCUMENTS

| | | | |
|---|---|---|---|
| 8,706,914 B2 | 4/2014 | Duchesneau | |
| 8,751,752 B2 | 6/2014 | Cota-Robles et al. | |
| 9,594,680 B1* | 3/2017 | Bussa | G06F 12/0808 |
| 2006/0271760 A1* | 11/2006 | Nicolai | G06F 12/1036 711/207 |
| 2009/0292899 A1* | 11/2009 | Mansell | G06F 12/1009 711/207 |
| 2013/0339654 A1* | 12/2013 | Bybell | G06F 12/1009 711/206 |
| 2014/0075151 A1 | 3/2014 | Cain, III et al. | |
| 2014/0115297 A1 | 4/2014 | Cain, III et al. | |
| 2015/0301951 A1* | 10/2015 | Bybell | G06F 12/1036 711/207 |
| 2016/0179569 A1 | 6/2016 | Gottschlich et al. | |

(Continued)

FOREIGN PATENT DOCUMENTS

EP 2889769 B1 5/2017

OTHER PUBLICATIONS

Yoon, H., Reducing Address Translation Overheads with Virtual Caching, 2017.

(Continued)

*Primary Examiner* — Gautam Sain
(74) *Attorney, Agent, or Firm* — Scully, Scott, Murphy & Presser, P.C.

(57) ABSTRACT

A method and system of translating addresses is disclosed that includes receiving an effective address for translation, providing a processor and a translation buffer where the translation buffer has a plurality of entries, wherein each entry contains a mapping of an effective address directly to a corresponding real address, and information on a corresponding intermediate virtual address. The method and system further include determining whether the translation buffer has an entry matching the effective address, and in response to the translation buffer having an entry with a matching effective address, providing the real address translation from the entry having the matching effective address.

13 Claims, 8 Drawing Sheets

150

(56) References Cited

U.S. PATENT DOCUMENTS

2017/0084000 A1* 3/2017 Seiler .................... G06F 7/76
2017/0371789 A1* 12/2017 Blaner ............... G06F 12/0831
2018/0107604 A1* 4/2018 Dooley .............. G06F 12/1009
2018/0239714 A1* 8/2018 Abhishek Raja ... G06F 12/1027

OTHER PUBLICATIONS

Cain III, H.W., Detecting and Exploiting Causal Relationships in Hardware Shared-Memory Multiprocessors, 2004.
Buffered Bloom Filter, IBM, Jul. 6, 2009.
Disclosed Anonymously, Optimization: Improving hashing efficiency for average and worst case lookup, Feb. 27, 2017.

* cited by examiner

BUFFER AND METHODS FOR ADDRESS TRANSLATIONS IN A PROCESSOR

BACKGROUND

The disclosure herein relates generally to information handling and/or data processing systems, and more particularly, to methods, apparatus, and systems for optimizing address translations in a computer system.

Among other tasks, memory management manages the data stored in a computer including overseeing the retrieval and storage of data from memory in a computer. Memory management is often a key factor in overall system performance for a computer. Computer systems often include physical memory used to store applications and data. Modern computers typically rely on a memory management technique known as virtual memory management to increase performance and provide greater flexibility in computers and the underlying architectural designs upon which they are premised.

Virtual memory management systems can include a hypervisor or virtual machine monitor (VVM), which is computer software, firmware, or hardware that creates and runs multiple virtual machines as guests on a computer where computing resources such as memory and processing capability are shared. With a virtual memory system, the underlying hardware implementing the memory system of a computer is effectively hidden from the software of the computer. Computer programs that execute on the computer access the memory system using addresses pointing to locations in the virtual memory space. The physical memory devices in the computer, however, are accessed via "real" addresses that map directly into specific memory locations in the physical memory devices. Hardware and/or software in the computer are provided to perform "address translation" to map the real memory addresses of the physical memory to virtualized addresses in the virtual memory space. As such, whenever a computer program on a computer attempts to access memory using a virtualized address, the computer translates the virtualized address into a corresponding real address so that access can be made to the appropriate location in the appropriate physical device mapped to the virtualized address.

A fully virtualized address translation architecture will have two scopes of address translation. One scope of address translation, referred to as a process-scoped translation, is for guest operating systems, e.g., virtual machines, running on top of the hypervisor, where the virtualized address used by the guest operating system is translated to an address recognizable and readable in the hypervisor environment. The other scope of address translation, referred to as a partition-scoped translation, is for the hypervisor where the virtualized address used by the hypervisor is translated into a real address that refers to a physical location in memory. Both of these translations will operate independently from software's point of view, but hardware must traverse such a nested translation to convert a virtualized address used by a virtual machine to a real machine address, i.e., a specific location in physical memory.

Address translation in a virtual memory system typically incorporates accessing various address translation data structures. One such structure, referred to as a page table, includes multiple entries, referred to as page table entries (PTEs), that map virtualized addresses to real addresses on a page-by-page basis. Often, due to the large number of memory accesses that constantly occur in a computer, the number of page table entries (PTEs) required to map all of the memory address space in use by a computer can be significant, and requires the entries to be stored in main storage, rather than in dedicated memory, which makes accessing such entries slow.

To accelerate address translation, high-speed memories referred to as translation look-aside buffers (TLB) are typically used to cache recently-used entries for quick access by the computer. With each memory access, the address to be translated is presented to the TLB, and if the TLB hits (has a matching entry), then the TLB provides an address to the processor. If the address misses in the TLB, a more costly hardware handler or software handler is invoked to load and insert the required address translation entry into the TLB so the address will hit in the TLB and the memory access can proceed.

Due to the frequency of memory access requests in a computer, address translation can have a significant impact on overall system performance. As such, it is desirable to minimize the amount of time to provide address translations.

SUMMARY

The summary of the disclosure is given to aid understanding of a computer system, computer architectural structure, processor, and method of translating addresses in a computer system, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, and their method of operation to achieve different effects.

A method of translating addresses by a processing system is disclosed that includes receiving an effective address for translation; providing a translation buffer having a plurality of entries, wherein each entry contains a mapping of an effective address directly to a corresponding real address, and information on a corresponding intermediate virtual address; determining whether the translation buffer has an entry matching the effective address; and in response to the translation buffer having an entry with a matching effective address, providing the real address translation from the entry having the matching effective address. In one or more aspects, the method further includes, in response to the translation buffer not having an entry with a matching effective address, determining the real address using other mechanisms. In one or more embodiments, the method further includes, in response to determining the real address using other mechanisms, loading the effective address to real address mapping into an entry in the translation buffer, and loading information on the corresponding intermediate virtual address into an entry in the translation buffer. In an embodiment, the information on a corresponding intermediate virtual address includes at least one of: a segment of the bit field of the intermediate virtual address, a hash of the intermediate virtual address, or a hash of a segment of the bit field of the intermediate address.

In another aspect, a computing system is disclosed that includes an address translation table cache having a plurality of entries for translating an effective address directly to a real address, wherein each entry maps an effective address or a portion of a bit field of the effective address to a real address that exits in physical memory, and each entry contains information on a segment of the bit field of an intermediate virtual address; and a processor. The system in an embodiment is configured to: receive an effective address for translation; determine whether the address translation table cache has an entry matching the effective address; and, in response to the translation buffer having an entry with a matching effective address, provide the real address translation from the entry having the matching effective address. In an aspect, the system is further configured to receive an intermediate virtual address for invalidation and determine whether an entry in the translation buffer matches the intermediate virtual address to be invalidated. In one or more embodiments, the system is configured to determine whether: a bit field segment of the intermediate virtual address to be invalidated matches a bit field segment of the intermediate virtual address stored in an entry in the translation buffer; a hash of the intermediate virtual address to be invalidated matches a hash of the intermediate address stored in an entry in the translation buffer; or a hash of a segment of the intermediate virtual address to be invalidated matches a hash of the bit field segment of an intermediate virtual address stored in an entry in the translation buffer.

In addition, a computing system is disclosed that includes an address translation table cache having a plurality of entries, wherein each entry maps a an effective address to a real address, and each entry further contains information on a segment of the bit field of an intermediate virtual address; a processor; and a non-transitory computer-readable storage medium comprising program instructions. In one or more embodiments, the program instructions when executed by the processor cause the processor to: receive an effective address for translation; determine whether the address translation table cache has an entry matching the effective address; and in response to the translation buffer having an entry with a matching effective address, provide the real address translation from the entry having the matching effective address. In an aspect, the system further comprises program instructions that when executed by the processor cause the processor to: receive an intermediate virtual address for invalidation; determine whether the translation buffer has an entry that matches the intermediate virtual address to be invalidated by determining whether: a bit field segment of the intermediate virtual address to be invalidated matches a bit field segment of the intermediate virtual address stored in an entry in the translation buffer; a hash of the intermediate virtual address to be invalidated matches a hash of the intermediate address stored in an entry in the translation buffer; or a hash of a segment of the intermediate virtual address to be invalidated matches a hash of the bit field segment of an intermediate virtual address stored in an entry in the translation buffer; and, in response to the translation buffer having an entry that matches the intermediate virtual address to be invalidated, invalidating the matching entry in the translation buffer, and in response to the translation buffer not having any entry matching the intermediate address to be invalidated, not invalidating any entry in the translation buffer.

The foregoing and other objects, features and advantages of the invention will be apparent from the following more particular descriptions of exemplary embodiments of the invention as illustrated in the accompanying drawings wherein like reference numbers generally represent like parts of illustrative embodiments of the invention.

BRIEF DESCRIPTION OF THE DRAWINGS

The various aspects, features and embodiments of a computer system, computer architectural structure, processor, and their method of operation will be better understood when read in conjunction with the figures provided. Embodiments are provided in the figures for the purpose of illustrating aspects, features, and/or various embodiments of the computer system, computer architectural structure, processors, and their method of operation, but the claims should not be limited to the precise arrangement, structures, features, aspects, systems, assemblies, subassemblies, systems, circuitry, embodiments, methods, processes, techniques, and/or devices shown, and the arrangements, structures, systems, assemblies, subassemblies, features, aspects, methods, processes, techniques, circuitry, embodiments, and devices shown may be used singularly or in combination with other arrangements, structures, assemblies, subassemblies, systems, features, aspects, circuitry, embodiments, methods, techniques, processes, and/or devices.

FIG. 7 is an exemplary flowchart illustrating and describing a method of.

DETAILED DESCRIPTION

Figure 1:
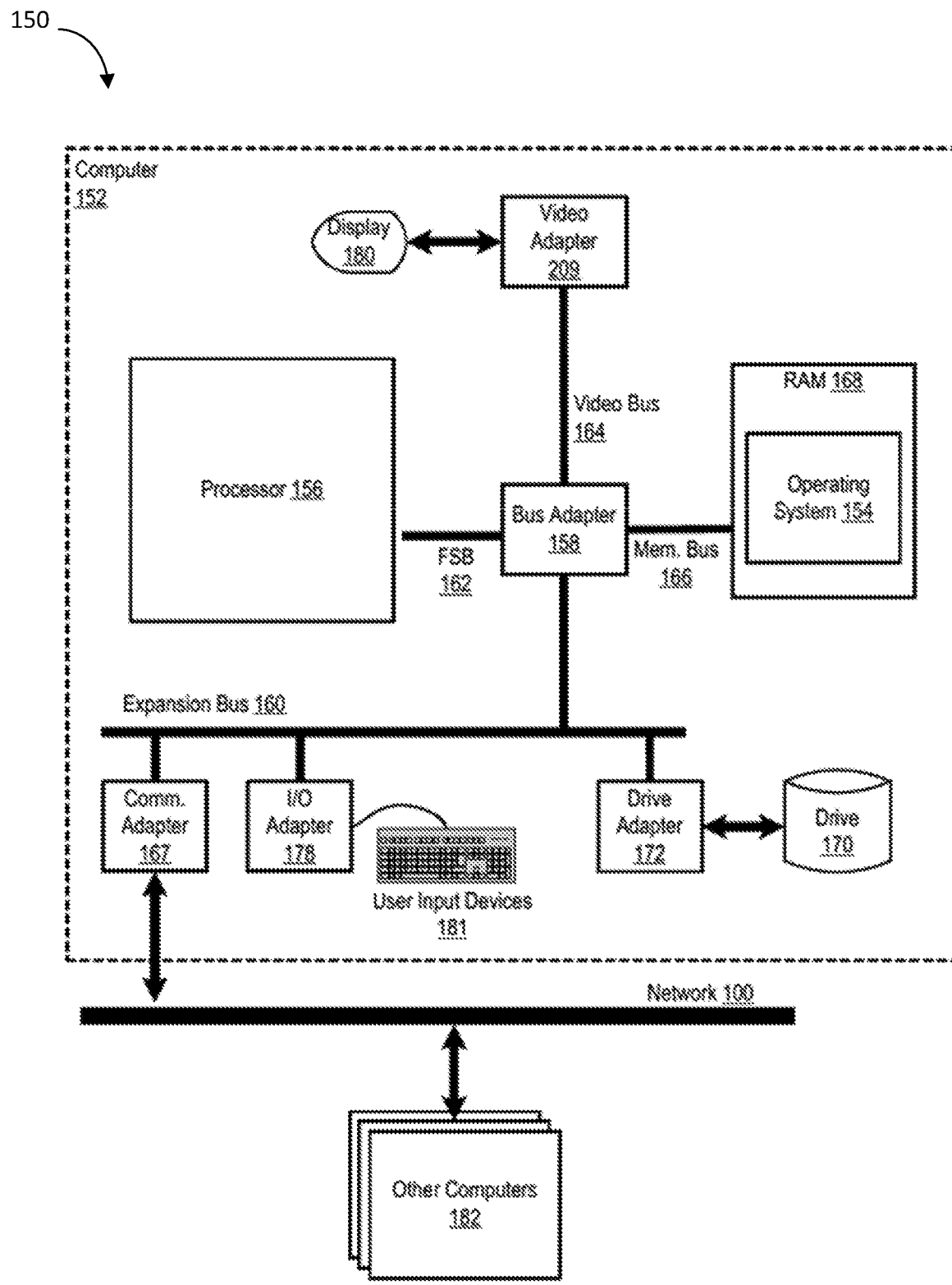
FIG. 1 is a functional block diagram illustrating a computer system, according to embodiments of the present disclosure.

The following description is made for illustrating the general principles of the invention and is not meant to limit the inventive concepts claimed herein. In the following detailed description, numerous details are set forth in order to provide an understanding of the computer system, computer architectural structure, processor, and their method of operation, however, it will be understood by those skilled in the art that different and numerous embodiments of the computer system, computer architectural structure, processor, and their method of operation may be practiced without those specific details, and the claims and disclosure should not be limited to the arrangements, structures, systems, assemblies, subassemblies, circuitry, features, aspects, processes, methods, techniques, embodiments, and/or details specifically described and shown herein. Further, particular features, aspects, arrangements, systems, embodiments, techniques, etc. described herein can be used in combination with other described features, aspects, arrangements, systems, embodiments, techniques, etc. in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising," when used in this specification and claims, specify the presence of stated features, integers, aspects, arrangements, embodiments, structures, systems, assemblies, subassemblies, steps, operations, elements, and/or components, but do not preclude the presence or addition of one or more other features, integers, aspects, arrangements, embodiments, structures, systems, assemblies, subassemblies, steps, operations, elements, components, and/or groups thereof.

The following discussion omits or only briefly describes conventional features of information processing systems, including processors and microprocessor systems and architectures, as well as address translation techniques and systems, which should be apparent to those skilled in the art. It is assumed that those skilled in the art are familiar with the general architecture of processors, and in particular with address translation techniques and systems, and their operation. It may be noted that a numbered element is numbered according to the figure in which the element is introduced, and is typically referred to by that number throughout succeeding figures.

Modern computer systems including systems using virtualized memory management can include a hypervisor or virtual machine monitor (VVM), which is computer software, firmware, or hardware that creates and runs multiple virtual machines as guests on a computer where computing resources such as memory and processing capability are shared. When running virtualization on processors, a fully virtualized address translation architecture will have two scopes of translation. The first scope of address translation, referred to as process-scoped translation, is where a virtualized address utilized by a virtual machine or guest machine running on a hypervisor needs translating to a virtualized address recognized and used by the hypervisor. The second scope of translation, referred to as a partition-scoped translation, is for the hypervisor where the virtualized address is translated into a real address, e.g., a specific location in physical memory. Both of these translations will operate independently from software's point of view, but hardware must traverse both translations in such a nested translation to convert a virtualized address running on a virtual machine to a real address.

Typically, to be able to effectively cache both scopes of translation (i.e., the partition-scoped translation and the process-scoped translation), two logically separate TLBs are created. One TLB caches the process-scoped translation and a different logical TLB caches the partition-scoped translation. Such a nested translation is subject to translation latency as first the process-scoped translation has to be looked up and read from the process-scoped TLB, and then the output of the process-scoped translation is used to look-up and read the output of the partition-scoped TLB. In other words, a virtualized (effective) address is converted to an intermediate virtualized address (gRA or VA) in a first (process-scoped) logical TLB, and the intermediate virtualized address (gRA/VA) is then translated to a final machine (real) address in the second (partition-scoped) logical TLB. This design, however, introduces latency as the intermediate virtualized address needs to be computed before translating the intermediate virtualized address to a real address can be started. A more optimized design to reduce, limit, and/or eliminate the delay associated with such a nested translation process would be advantageous.

The slow latency issue from such a nested translation can be mitigated by merging the partition-scoped TLB and process-scoped TLB into a single TLB structure. Under the new merged TLB structure, the intermediate step can be removed allowing the new merged TLB to translate the virtualized address in a single step. The virtual (effective) address can be converted immediately to the machine (real) address without reading (or waiting for) the intermediate virtualized address. This merged translation, however, loses all the intermediate virtualized address information. When the hypervisor or the hosting program wants to change a translation, it will want to invalidate a specific intermediate virtualized address. The intermediate virtualized address, however, is not stored, e.g., cached, in the merged TLB, and thus if the host or hypervisor wants to change the intermediate virtualized address, the only recourse is to conservatively invalidate the entire contents of the merged TLB. Such conservative invalidation of many TLB entries in the merged TLB could lead to significant loss of computing and/or processor performance since many of the merged TLB entries are still valid and could still be used, but they were removed by the TLB invalidate.

Disclosed are techniques and systems to translate memory addresses from a computerized virtual environment to a real or physical computer memory environment. Disclosed are techniques and systems to translate effective memory addresses to real addresses in a faster more efficient manner. Disclosed are techniques and systems to translate memory addresses in a faster more efficient manner using a merged TLB that reduces the number of entries in the TLB that will be removed when addresses are changed, e.g., during a TLB invalidate process. In an embodiment, a merged TLB is disclosed that caches a mapping between an effective address and a real address and also caches information on the partition-scoped address translation, e.g., the intermediate virtual address. In an aspect, the merged TLB stores a portion of the intermediate virtual address (gRA), and in one or more embodiments, stores a hash of the intermediate virtualized address (partition-scoped address translation), or a portion of the intermediate virtual address (gRA).

Address translation typically occurs in a data or information handling environment, and more specifically commonly in a processor based system and/or a computerized environment. FIG. 1 is a functional block diagram illustrating a computer system 150 in which embodiments of the disclosure may be practiced. The system 150 includes an example of automated computing machinery in the form of a computer 152.

The computer 152 may include at least one processor 156 or central processing unit ("CPU") as well as random access memory 168 ("RAM"), which is connected via a high speed memory bus 166 and bus adapter 158 to the processor 156 and to other components of the computer 152.

Although the processor 156 is shown to be coupled to RAM 168 through the front side bus 162, the bus adapter 158, and the high speed memory bus 166, those of ordinary skill in the art will recognize that such configuration is only an exemplary implementation and other configurations of coupling the processor 156 to other components of the system 150 may be utilized. For example, in some embodiments the processor 156 may include a memory controller configured for direct coupling to the memory bus 166. Yet, in other embodiments, the processor 156 may support direct peripheral connections, such as Peripheral Component Interconnect express ("PCIe") connections and the like.

An operating system 154 may be stored in RAM 168 of the computer 152. Operating systems, useful in computers configured for operation of a processor, may include UNIX™, Linux™, Microsoft Windows™, AIX™, IBM's z/OS™, and others known to those of ordinary skill in the art. In addition to the operating system 154 being located in RAM 168, other components of such as data processing applications may be stored in the RAM 168. Furthermore, software and other components may be stored in non-volatile memory, such as on a disk drive 170.

The computer 152 may include a disk drive adapter 172 coupled through an expansion bus 160 and bus adapter 158 to the processor 156 and other components of the computer 152. The disk drive adapter 172 may connect non-volatile data storage to the computer 152 in the form of the disk drive 170. The disk drive adapter may include Integrated Drive Electronics ('IDE') adapters, Small Computer System Interface ('SCSI') adapters, and others known to those of ordinary skill in the art. Non-volatile computer memory may also be implemented as an optical disk drive, electrically erasable programmable read-only memory (so-called 'EEPROM' or 'Flash' memory), RAM drives, and others known to those of ordinary skill in the art.

The computer 152 may include one or more input/output ("I/O") adapters 178. I/O adapters 178 may implement user-oriented input/output through, for example, software drivers and computer hardware for controlling output to display devices, such as computer display screens, as well as user input from user input devices 181, such as a keyboard and mouse. The computer 152 may include a video adapter 209, which is an example of an I/O adapter specially designed for graphic output to a display device 180, such as a display screen or computer monitor. Video adapter 209 is connected to the processor 156 through the high speed video bus 164, bus adapter 158, and the front side bus 162, which may also be a high speed bus. I/O adapters 178 may also include COMM and Drive adapters. I/O adapters 178 may also be a PCI Express in which all I/Os are connected.

The computer 152 may include a communications adapter 167 for data communications with other computers 182 and for data communications with a data communications network 100. Such data communications may be carried out serially through RS-232 connections, through external buses such as a Universal Serial Bus ("USB"), through data communications networks such as IP data communications networks, and in other ways known to those of ordinary skill in the art. Communications adapter 167 may implement the hardware level of data communications through which one computer sends data communications to another computer, directly or through the data communications network 174. Examples of the communications adapter 167 may include modems for wired dial-up communications, Ethernet (IEEE 802.3) adapters for wired data communications, and 802.11 adapters for wireless data communications.

The arrangement of computers and other devices illustrated in FIG. 1 are for explanation, not for limitation. Data processing systems useful according to various embodiments of the present disclosure may include additional servers, routers, other devices, and peer-to-peer architectures. Networks in such data processing systems may support many data communications protocols, including, for example, TCP (Transmission Control Protocol), IP (Internet Protocol), HTTP (HyperText Transfer Protocol), WAP (Wireless Access Protocol), HDTP (Handheld Device Transport Protocol), and others known to those of ordinary skill in the art. Various embodiments of the present disclosure may be implemented on a variety of hardware platforms, in addition to those illustrated in FIG. 1.

Figure 2A:
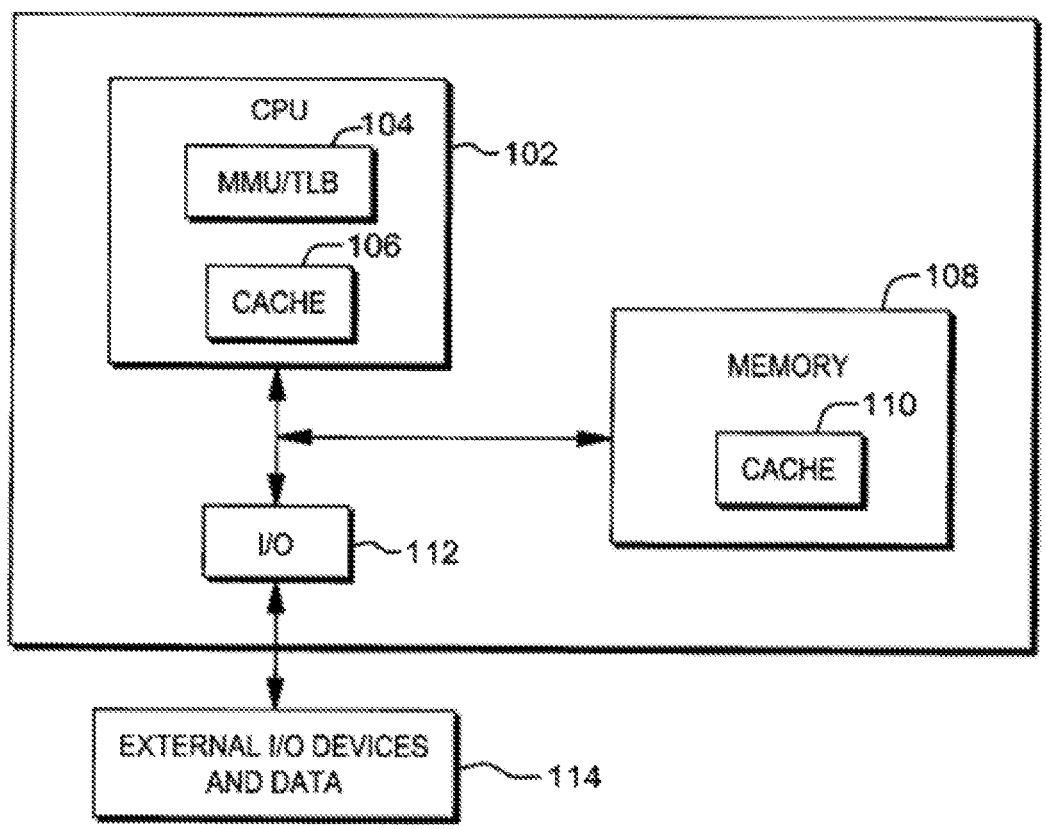
FIG. 2A depicts one example of a computing environment.

One example of a computing environment to incorporate and use one or more aspects of address translation capability is described with reference to FIG. 2A. In one example, a computing environment 150 includes a processor (central processing unit—CPU) 102 that includes at least a cache 106 and at least one memory management unit (MMU) having a translation look-aside buffer (TLB), referred to as MMU/TLB portion 104. Processor 102 is communicatively coupled to a memory portion 108 having a cache 110, and to an input/output (I/O) portion 112. I/O portion 112 is communicatively coupled to external I/O devices 114 that may include, for example, data input devices, sensors and/or output devices, such as displays.

Memory management unit 104 is used in managing memory portion 108 including facilitating access to the memory by providing address translation. In an embodiment, to improve address translation, the memory management unit (MMU) utilizes a translation look-aside buffer (TLB). The TLB is a cache of previously translated addresses. Thus, when a request is received for a memory access that includes an address to be translated, typically the TLB is checked first. If the address is cached in the TLB, then the address is provided to the processor. Otherwise, the received address is translated using one of any number of translation techniques.

Figure 2B:
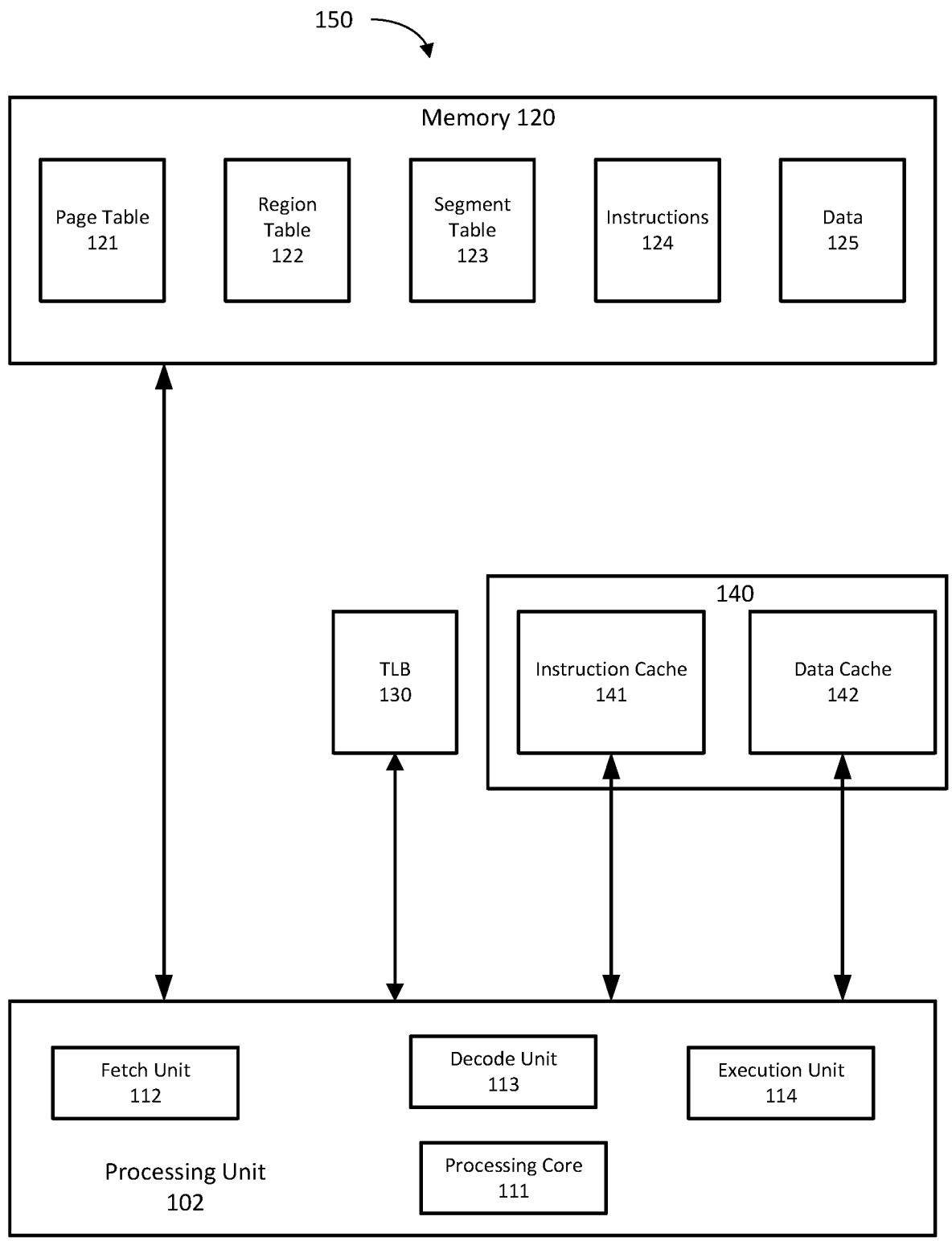
FIG. 2B depicts another example of a computing environment.

FIG. 2B illustrates a block diagram of an embodiment of a processing system 150 where partition-scoped address translation between a virtual environment and physical memory may be implemented. The processing system 150 includes a processing unit 102, memory 120, a translation look-aside buffer 130, and cache memory 140. Cache memory 140 includes instruction cache 141 and the data cache 142, which store instructions and data, respectively, for quick access by the processing unit 102 during execution of instructions.

The processing unit 102 receives data, such as operand data and instructions, and executes the instructions. The processing unit 102 may include, for example, a processing core 111 including logic and other circuitry for processing data and instructions, a fetch unit 112 configured to fetch instructions, a decode unit 113 configured to decode instructions, and an execution unit 114 configured to execute the instructions. Although a few functional units of the processing unit 102 are illustrated for purposes of description, it is understood that the processing unit 102 may include additional functional units for retrieving, processing, and storing instructions and data.

Processing system 150 further includes memory 120 configured to store instructions 124 and data 125 which may be accessed and manipulated by the instructions 124. The memory 120 can include volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cassette or the like, etc.). Moreover, the memory 120 may incorporate electronic, magnetic, optical, and/or other types of storage media. In some embodiments, the memory 120 may have a distributed architecture, where various components are situated remote from one another, but can be accessed by the processing unit 102. In this disclosure, the terms physical memory, real memory, system memory and absolute memory are used interchangeably to refer to the main storage accessible to a physical processor.

Address translation in a virtual memory system typically incorporates accessing various address translation data structures. Memory 120 includes dynamic address translation structures, such as a page table 121, region table 122, and segment table 123. Page table 121 includes multiple entries that map virtual addresses to real addresses on a page-by-page basis. Likewise, for handling segmentation, segment table 123 includes entries that map effective addresses to virtual addresses on a segment-by-segment basis.

Page table 121 maps addresses on a page-by-page basis and includes one or more page table entries (PTEs). TLB 130 is a data structure used for storing some of the address mappings by caching entries (PTEs) from page table 121 located in memory 120. In the embodiment of FIG. 2B, TLB 130 stores mappings from virtual memory addresses (VA) to physical memory or real addresses (RA). The TLB in FIG. 2B may include virtual addresses, real addresses corresponding to the virtual addresses, and additional information that categorizes or defines one or more of the virtual addresses and the real addresses or provides information to a processing unit about the real address or the virtual address. In one or more embodiments, the TLB 130 may be a content addressable memory (CAM).

In the embodiment of FIG. 2B, in operation, the fetch unit 112 fetches an instruction from memory 120 or from the instruction cache 141. The decode unit 113 reads the instruction and determines or identifies one or more virtualized addresses referenced by the instruction. The decode unit 113 may access the TLB 130 for the partition-scoped address translation, e.g., virtual-to-real address translation. If the virtualized address is included as an entry in the TLB, the real address (RA) is provided to the CPU, along with any additional information in the entry, such as data access information, page size, etc., and the system can proceed to use the corresponding physical memory address received from the TLB. If the virtual-to-real address translation is not found in the TLB 130, the processing unit 102 may access the page table 121 to obtain a virtual-to-real address translation, or the processing unit 102 may build a new virtual-to-real address translation. Once a virtual-to-real address translation is built or accessed from the page table 121, the virtual-to-real address translation may be loaded (stored) in the TLB 130 for quick access. For example, accessing memory 120 by processing unit 102 may require more operations than accessing the TLB 130, and data transmission times may be slower between the memory 120 and the processing unit 102 than between the TLB 130 and the processing unit 102.

Virtual addresses are often partitioned for the purposes of address translation into offset bits and effective address bits, with the offset bits pointing to a specific address in a page. The effective address bits or the effective page number (EPN) may include tag and set-index bits. TLB entries generally only map a certain number of bits from a virtual address to a corresponding number of bits in a physical address. The number of bits mapped is a function of the page size associated with the virtual address. For example, for a 4 KB page size, the first 12 bits of the physical address represent offset bits within a page, because 12 bits are sufficient to address every memory location within a 4 KB page. In a TLB storing 4 KB page size entries, these first 12 bits are ignored during a TLB lookup, and typically only higher order bits are used. In a system using 64 bit addressing, the remaining 52 bits of the address typically would be used in a TLB storing 4 KB page size entries. In another example, for a 1 GB page size, the first 30 bits of the physical address represent offset bits within a page, and the remaining 34 bits would be effective address bits and typically would be used in a TLB storing 1 GB page size entries.

Figure 3:
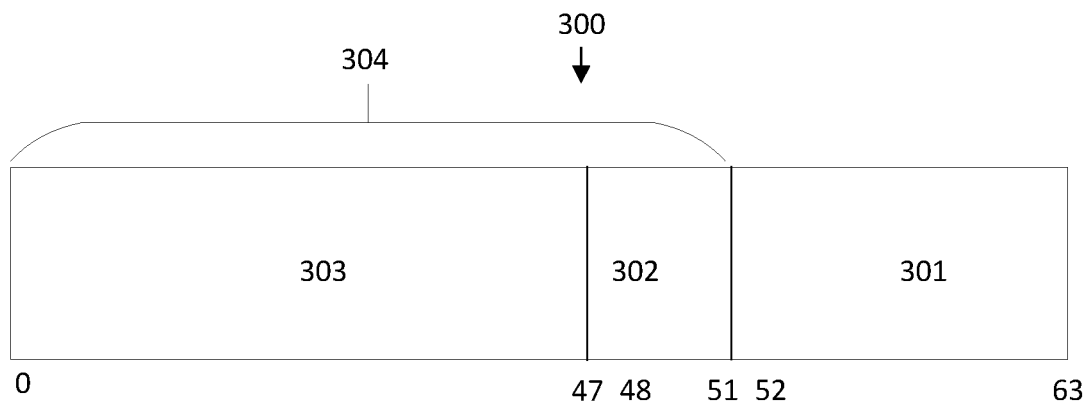
FIG. 3 illustrates an example of portions of a virtual address for use in translation.
Figure 3:
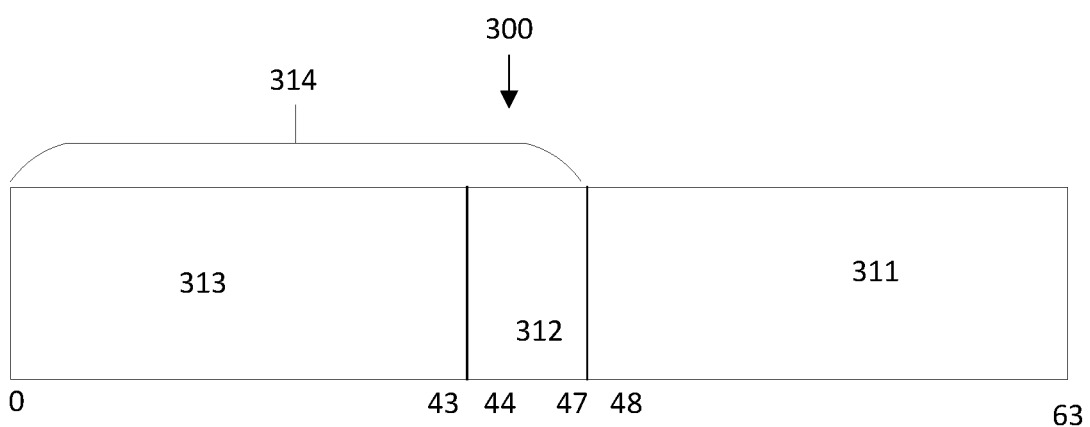

FIG. 3 shows a virtual address 300 comparison for a 4 KB page (top) and for a 64 KB page (bottom). For a 4 KB page virtual address, offset bits 301 would be [52:63], and effective address bits 304 would be [0:51] where the set-bits 302 would be [48:51], and the tag bits 303 would be [0:47]. In contrast, for a 64 KB page virtual address, the offset bits 311 would be [48:63], and the effective address bits 314 would be bits [0:47] where the set bits 312 would be [44:47], and the tag bits 313 would be [0:43] (a larger offset would logically be required to address the larger page size).

Figure 4:
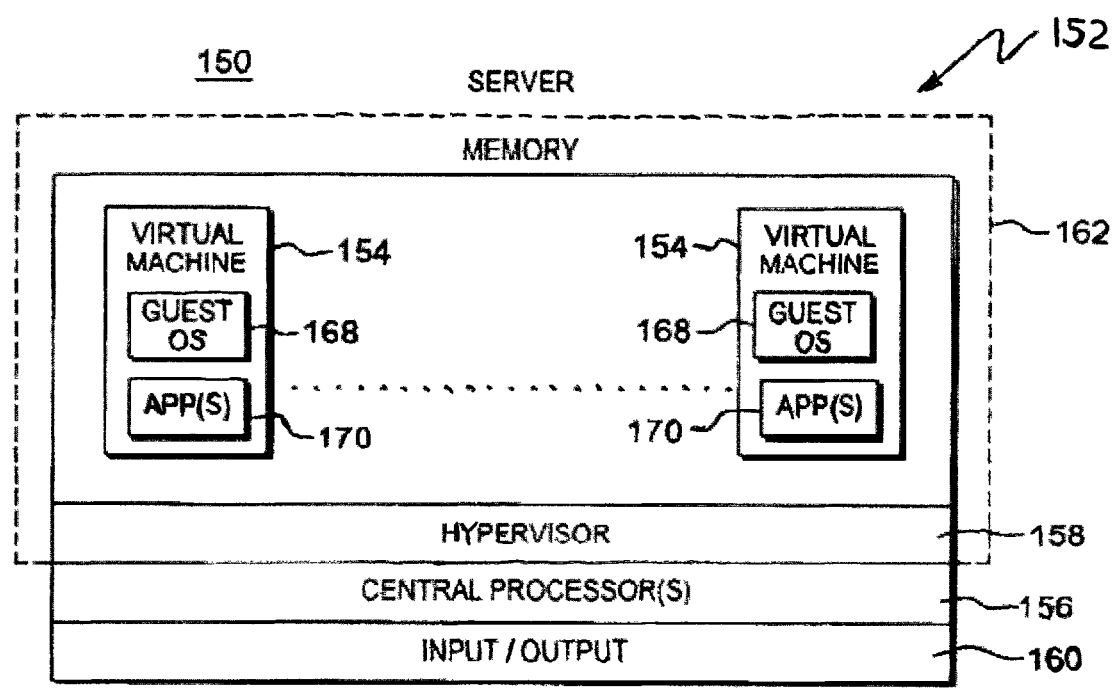
FIG. 4 is a functional block diagram illustrating a processing system within which address translation can be implemented.

An embodiment of a computing environment that can incorporate and use one or more aspects of the present invention is depicted in FIG. 4. In this example, a computing environment 150 includes a server 152 that includes, for instance, one or more virtual machines 154, one or more central processor(s) (e.g., central processing units) 156, at least one hypervisor 158, and an input/output subsystem 160. The virtual machines 154 and hypervisor 158 are included in memory 162.

In this embodiment, each virtual machine is capable of hosting a guest operating system 168 and may be executing one or more applications 170. An operating system or application running on a virtual machine 154 appears to have access to a full complete system, but in reality, only a portion of it is available. Central processor(s) 156 (e.g., central processing units) are physical processor resources that are assignable to a virtual machine 154. For instance, virtual machine 154 includes one or more logical processors, each of which represents all or a share of physical processor(s) 156 that may be dynamically allocated to the virtual machine. Virtual machines 154 are managed by hypervisor 158, such as PowerVM, offered by International Business Machines Corporation, as an example. Central processor(s) 156, like CPU 102, includes at least one MMU/TLB portion and at least one cache.

To perform address translation in the system of FIG. 4, a first address translation between the virtual machine 154 and the hypervisor 158 is required. This first address translation between the virtual machine or guest operating system running on top of the hypervisor is referred to as a process-scoped translation. The process-scoped translation is from virtual environment to virtual environment. The address used by the virtual or guest operating system is referred to as an effective address (EA), and it is translated to an intermediate virtual address (VA) used and recognized by the hypervisor 158. A second address translation is required between the hypervisor 158 and the real address (RA) in physical memory. This second address translation for the hypervisor between the hypervisor virtual environment and the real (physical) memory is referred to as a partition-scoped translation. The partition-scoped translation is between the intermediate virtual address (VA) and a physical or real address (RA). This partition-scoped address translation was discussed above in connection with FIG. 2B.

During operation, in a fully virtualized system having virtual machines running on a hypervisor, when a program running on a virtual machine needs to access a memory location, it will reference the location using an effective address (EA) associated with its virtual memory space. Typically, the effective address is sent to a first TLB to provide a process-scoped translation of the effective address (EA) to an intermediate virtual address (VA or gRA). If the first TLB has an entry that includes a mapping for the effective address (EA), the first TLB provides an intermediate virtual address (VA or gRA) that is sent to a second TLB, e.g., TLB 130. The second TLB provides a partition-scoped address translation of the intermediate virtual address (gRA) to a real address, e.g., a physical memory location. If the second TLB has an entry that includes a mapping of the intermediate virtual address to the real address, the second TLB provides the real address. Converting such a nested translation through two independent TLB arrays can cause delay in obtaining translation of the effective address (EA) to a real address (RA).

Disclosed is a method and system for facilitating the translation of an effective address directly to a real address. In one or more embodiments, the method and system provide a faster translation of effective addresses to real addresses than a system architecture having two independent TLB structures performing two separate, independent address translation look-ups. In an embodiment, a merged translation look-aside buffer is provided that caches a nested translation, and in one or more embodiments maps an effective address directly to a real address, and in one or more aspects provides sufficient information on the intermediate virtual address to facilitate TLB invalidations of intermediate virtual addresses (gRA).

Figure 5:
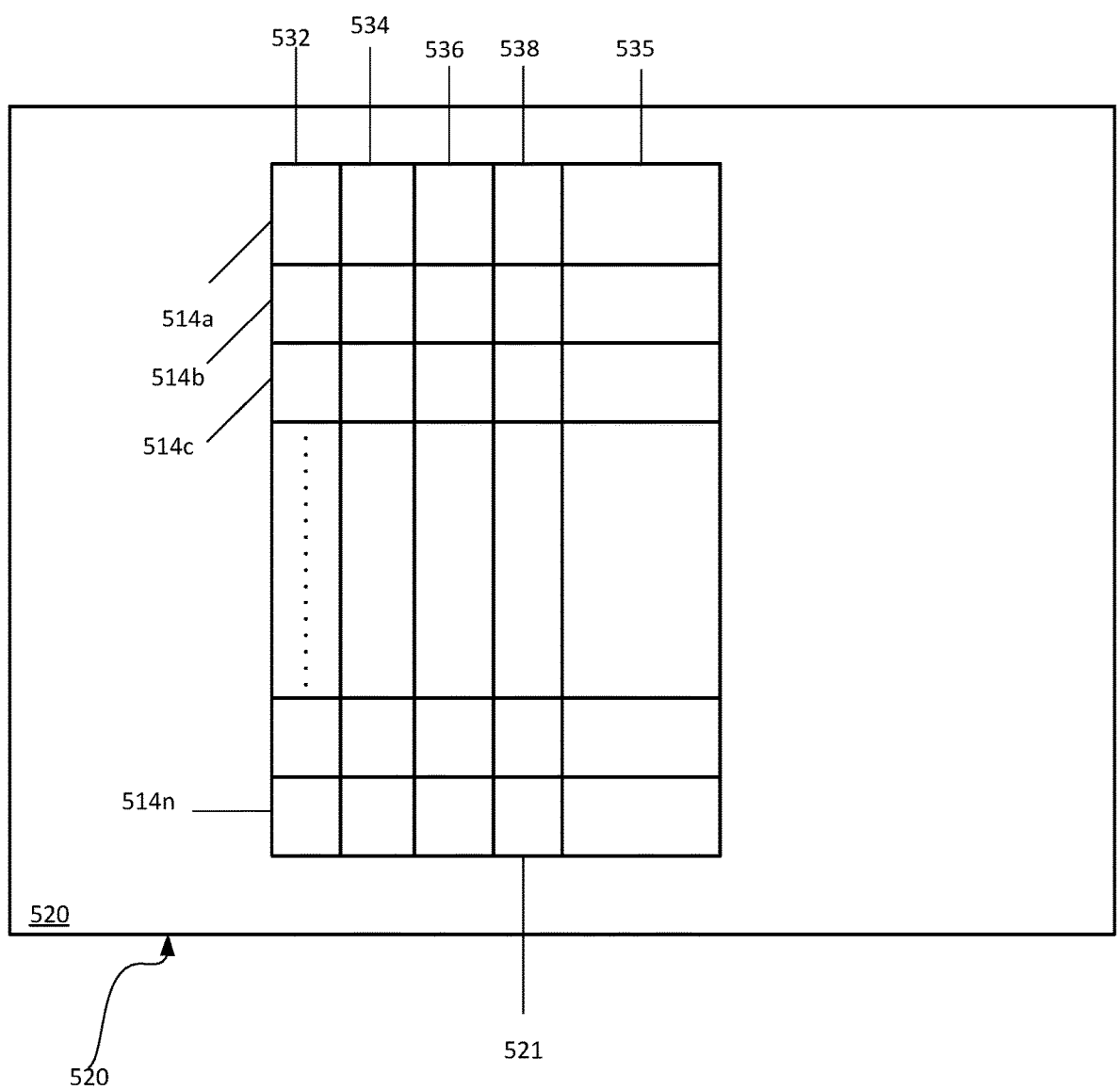
FIG. 5 illustrates a block diagram of an example of a merged TLB according to embodiments of the present disclosure.

FIG. 5 illustrates an exemplary merged translation look-aside buffer (TLB) 520 according to an embodiment of the present disclosure configured for facilitating translation of an effective address (EA) directly into a real address (RA). The merged TLB 520 provides a mapping between an effective address (EA), such as an address used by a virtual machine operating on a hypervisor or virtualized system, and a real address (RA), such as a physical memory location used to access data in a computerized system. As shown in FIG. 5, merged TLB 520 includes a TLB array 521 having multiple columns and rows. Each row in the TLB 520 (514a-n in array 521) represents an entry 514 that maps effective addresses (EA) to real addresses (RA), i.e., specific locations in physical memory.

Referring to illustrative merged TLB 520, each entry (row) 514 in the array 521 may include an effective address 532 and an associated real address 534. The entry 514 may also include additional information, such as a page size 536 and data access information 538. Examples of data access information 538 includes data access levels, such as limiting data access to read-only or allowing read operations and write operations, and subspace information, which defines programs that may access the real address. Although some examples of additional information are provided by way of example, embodiments of the present disclosure encompass any additional information stored in an entry of a TLB array, where the additional information is not the effective address, the real address, or the intermediate virtual address.

When the translation mappings are loaded into the merged TLB 520 by a table walker, it will store (load) in each entry 514 an effective address (EA) into 532 and the corresponding final real address (RA), i.e., the final machine address, in 534. This effective address (EA) to final real address (RA) mapping in the merged TLB 520 provides faster translations than an architecture having two independent, separate TLB structures, and decreases and/or minimalizes latency involved in address translations. The merged TLB 520 in one or more embodiments maps bit field portions of the effective address to bit field portions of the real address, and in one or more aspects maps bit field portions of the effective address and/or hashed bit field portions of the effective address to a real address, a hashed real address, bit field portions of a real address, or hashed bit field portions of a real address.

The merged TLB 520 further includes for each entry 514 information on the associated intermediate virtual address 535, or the associated intermediate virtual address 535. In an embodiment, the merged TLB 520 does not include the full intermediate virtual address, but rather a segment or portion of the bit field of the intermediate virtual address, or a hash of the intermediate virtual address, and in an aspect, a hash of a segment or portion of the bit field of the intermediate virtual address. The segment of the bit field of the intermediate virtual address, the hash of the intermediate virtual address, and/or the hash of the segment of the bit field of the intermediate virtual address is for identifying the intermediate virtual address.

The table walker knows the intermediate virtual address (gRA) because it resolved that translation and the intermediate virtual address (gRA) was used by the table walker to traverse the nested page table structure. In one or more embodiments, not the entire bit field of the intermediate virtual address is used or selected for use in the merged TLB. Rather, only a segment or portion of the intermediate virtual address bit field is needed to determine the intermediate virtual address. Instead of storing the whole bit field of the intermediate virtual address (VA), in an embodiment, a segment or portion of the bit field of the intermediate virtual address, or a hash of the intermediate virtual address, or a hashed version of a segment or portion of the bit field of the intermediate virtual address is stored in 535 in the merged TLB 520 in an entry 514 that includes the corresponding EA to RA mapping.

The bits of the intermediate virtual address to select as the segment or portion of the bit field to use in the merged TLB, or to select as the segment or portion of bit field to hash and use in the merged TLB, can vary and will depend upon a number of design factors and the implementation. The portion and the number of bits of the intermediate virtual address bit field used in the merged TLB in an embodiment is selected so that the number of false positives are minimized so that the performance loss is neglible, and/or within acceptable limits. The selection of the bit field portion to use preferably uses fewer bits, and in an embodiment many less bits, than the full intermediate virtual address and reduces the large overhead on the processor if the whole intermediate virtual address is included in the merged TLB.

Only a small segment or portion of the bit field of the intermediate virtual address may be required to provide matches without providing too many false positives, and the bit field portion of the virtual address preferably is selected from the higher order virtual address bits, and more preferably from the effective address portion (EPN) of the virtual address. The segment or portion of bits from the virtual address to use for the merged TLB, or to use for the hash, used in the merged TLB, will depend upon the implementation used. For example, page size effects the segment or portion of the bit field of the intermediate virtual address to use for the merged TLB, and the segment or portion of the intermediate virtual address to use for the hash used in the merged TLB. In one or more embodiments, the pertinent portion of the intermediate virtual address to select are those bits that will find the matching intermediate virtual address without too many false positives, and yet provide a desirable level of performance increase. In other words, a balance will be needed as the larger the bit field segment of the intermediate virtual address selected the lower the performance, but the greater the accuracy (less false positives), and the smaller the bit field segment selected, the greater performance benefit, but with higher false positives.

In one or more embodiments, a hash of the selected bit field of the intermediate virtual address (gRA) is utilized in the merged TLB so that the number of false positives when performing a TLB invalidate operation is minimized. That is, by using enough bits from the intermediate virtual address, and having a good hash, the probability of a false positive, i.e., inaccurate identification of virtual addresses to be invalidated, can be reduced, minimized, and/or be sufficiently low to increase performance of address translation in the merged TLB, and increase invalidation performance. In an embodiment, effective address bits selected as the bit field segment to use and/or hash and use in the merged TLB 520 typically vary depending upon the partition scoped page size. In an example, for a 4K partition scoped page size, the bit field selected to use in the merged TLB, or to hash for the merged TLB is effective address gRA(12:21) xor gRA(22:31) xor gRA (32:41) xor gRA(42:51), although other bits of the intermediate virtual address (gRA) are contemplated. In one or more embodiments, the bit field for the intermediate virtual address may be exclusive of an optional bit field that includes the identity of the virtual machine. In the example of a 4K page size, the selected bit field for the intermediate virtual address may be gRA(12:21) xor gRA(22:31) xor gRA (32:41) xor gRA(42:51) xor effLPID(2:11)

Further examples of the bit field selected for the intermediate virtual address for various page sizes include the following Table.

| Page Size | Selected Portion of Intermediate Virtual Address Bit Field |
|---|---|
| 4 KB | gRA(12:21) xor gRA(22:31) xor gRA(32:41) xor gRA(42:51) |
| 64 KB | gRA(8:17) xor gRA(18:27) xor gRA(27:37) xor gRA(38:47) |
| 2 MB | gRA(13:22) xor gRA(23:32) xor gRA(33:42) |
| 1 GB | gRA(14:23) xor gRA(24:33) |

The above bits fields are only examples and other bit field selections are contemplated. In the examples and embodiments described and explained herein, the effective address uses 64 bits for explanation and not as a limitation on the illustrative embodiments. One or more embodiments can be practiced with an addressing system of any bit field size (width).

If the system has multiple page sizes, the table walker should remember the partition-scoped page size and store it in the merged TLB 520 in the corresponding entry 514 at 536, along with the bit field segment (portion), or hash of the bit field segment (portion), of the intermediate virtual address at 535. Since each page has a different set of bits used to identify the intermediate virtual address space, the pertinent portion of the intermediate virtual address and the hash of the pertinent portion is unique for each page size stored in the merged TLB. For example, a 2M partition-scoped page will have a different hash than a 64K partition-scoped page. Accordingly, including the page size will facilitate the effectiveness of the merged TLB.

The merged TLB 520 provides faster translations of effective addresses to real addresses, and also retains information on intermediate virtual addresses so that invalidations of specific intermediate virtual addresses can be accomplished without invalidating all the entries 514 in the merged TLB 520. When the hypervisor issues an invalidation to a specific intermediate virtual address of a specific page size, in an embodiment, the hardware will compare the bit field segment (portion) of the intermediate virtual address that is being invalidated to the same bit field portion used in 535 in the entries 514 in the merged TLB 520. A comparison will be made to each entry 514 in the merged TLB. If there is a match between the intermediate virtual address stored in the merged TLB and the intermediate address being invalidated, the entry 514 in the merged TLB is invalidated.

In one or more embodiments, where the merged TLB stores a hash of the intermediate virtual address, or a hash of a bit filed segment of the intermediate virtual address, when the hypervisor issues an invalidation to a specific intermediate virtual address of a specific page size, in an embodiment, the hardware will compute the hash of the bit field segment (portion) of the intermediate virtual address for the specific page size. The bit field portion and the hash used are that same bit field and hash used to create and map the intermediate virtual addresses in the merged TLB. The computed hash corresponding to the specific intermediate virtual address to be invalidated is then used to search the merged TLB for entries that have a matching hash and a matching page size. That is the hash of the intermediate virtual address to be invalidated will be compared to the hash of the virtual addresses stored at 535 in each entry 514 of the merged TLB 520. If there is a matching intermediate virtual address hash in the merged TLB, including in one or more embodiments a matching page size, the entry in the merged TLB is invalidated.

Figure 6:
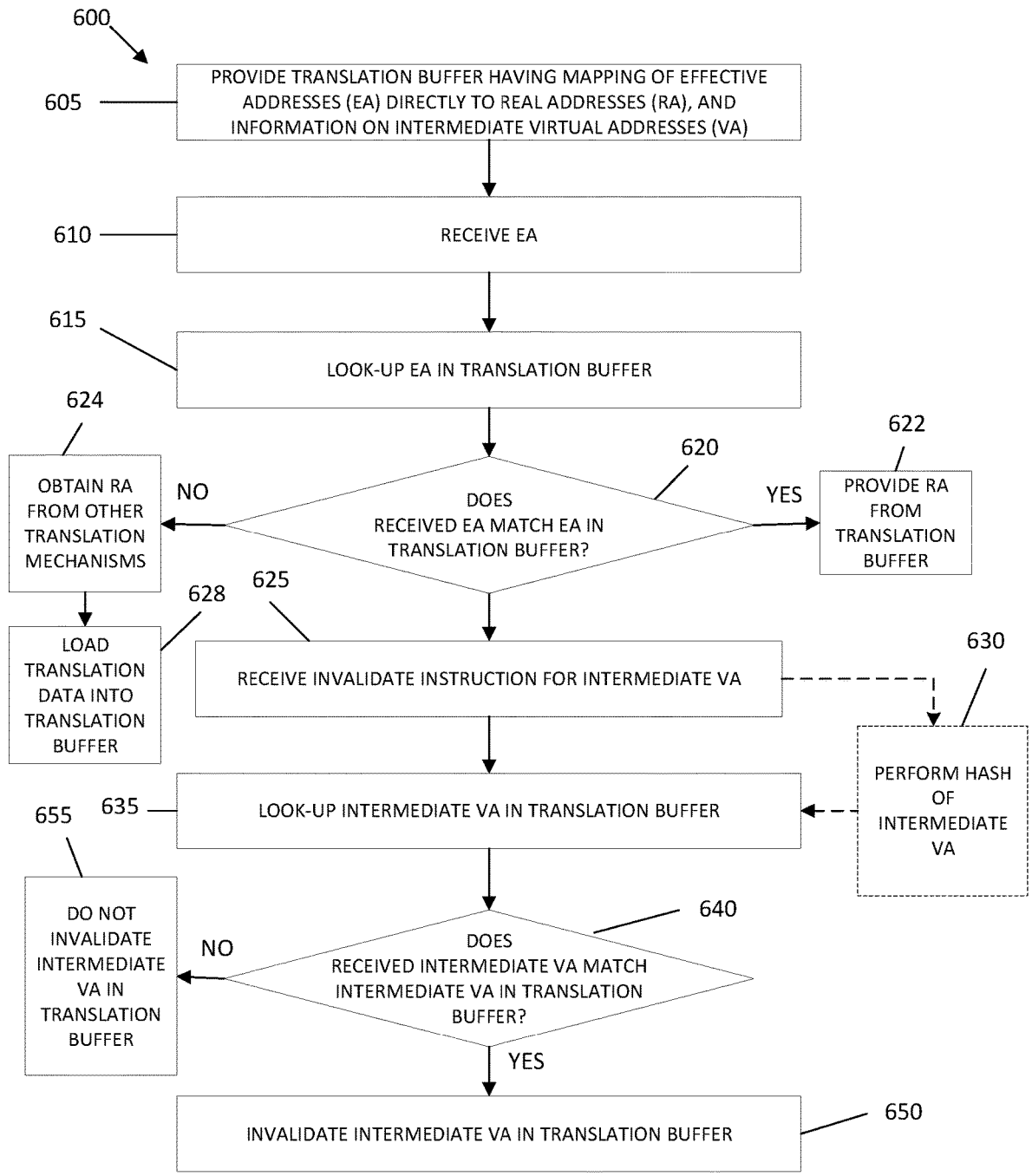
FIG. 6 is an exemplary flowchart illustrating and describing a method of translating addresses in an information handling and/or data processing system.
Figure 7:
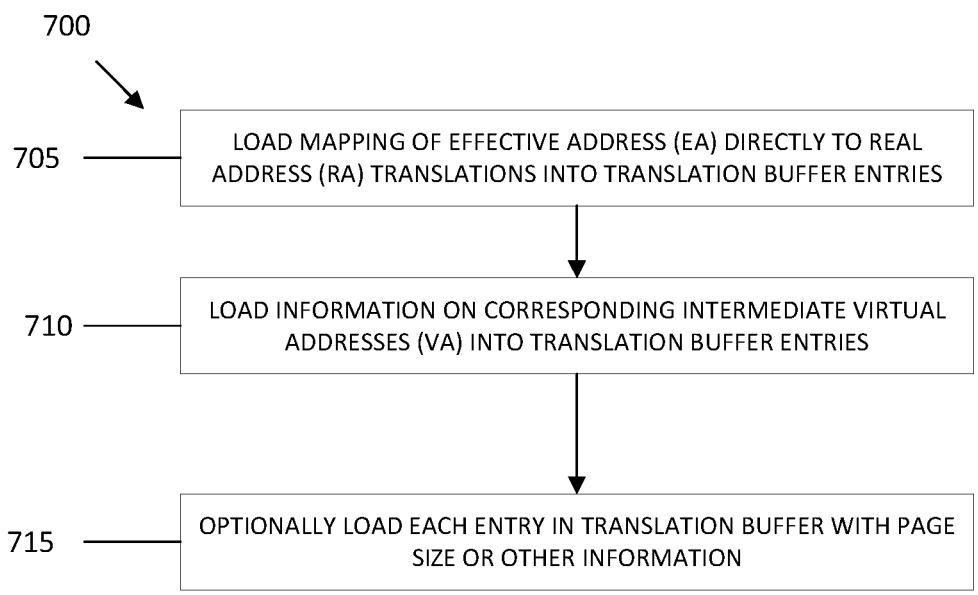

FIG. 6 is an exemplary flowchart in accordance with one or more embodiments illustrating and describing a method of performing address translation, more specifically an example of a method of translating an effective address (EA) into a real address (RA). FIG. 7 is an exemplary flowchart in accordance with one or more embodiments illustrating and describing a method of translating effective addresses to real addresses, and more specifically an example of a method of creating a merged buffer, preferably a merged translation look-aside buffer, having direct address translations of effective addresses to corresponding real addresses, and including pertinent information on the associated intermediate virtual addresses. While the methods 600 and 700 are described for the sake of convenience and not with an intent of limiting the disclosure as comprising a series and/or a number of steps, it is to be understood that the processes do not need to be performed as a series of steps and/or the steps do not need to be performed in the order shown and described with respect to FIGS. 6 and 7, but the processes may be integrated and/or one or more steps may be performed together, simultaneously, or the steps may be performed in the order disclosed or in an alternate order.

In FIG. 6 a flow chart of a method 600 of translating addresses is illustrated, more specifically a method of performing translation of effective address (EA) to real address (RA) translation in a faster and more efficient manner. The method 600 includes in an embodiment a process of using a merged translation buffer disclosed and discussed in connection with FIGS. 5 and 7. In one or more embodiments, the method 600 also includes invalidating intermediate virtual addresses in a translation buffer. The method 600 at 605 in an embodiment includes providing, creating, and/or using a buffer having direct translations of effective address to real address translations, and in one or more aspects includes a process-scoped translation and partition-scoped address translation in a single merged buffer. The method 600 in an embodiment includes a translation buffer, more preferably a translation look-aside buffer (TLB) associated with a processor, preferably a merged TLB, that include a plurality of entries that include mappings of effective addresses directly to real addresses.

The method 600 further includes at 605 in one or more embodiments a translation buffer that also includes information on an intermediate virtual address, e.g., the partition-scoped translation, and in an aspect includes information in each entry on the intermediate virtual address information associated with and/or corresponding to the effective address to real address translation in that buffer entry (referred to herein as the associated or corresponding (intermediate) virtual address). In one or more embodiments, one or more entries, and preferably all entries, in the address translation buffer, preferably a TLB, include a segment or portion of the bit field of the associated or corresponding virtual address; a hash of the associated or corresponding virtual address; or a hash of a segment or portion of the bit field of the associated or corresponding virtual address. The segment or portion of the bit field of the virtual address selected to include in, or to hash and include in, the translation buffer will depend on the implementation and the desired performance characteristics, and preferably will be optimized for the particular application as discussed above. The bit field selected for the associated or corresponding virtual address can be predetermined, adjustable, and/or programmable. The translation buffer at 605 in one or more embodiments can include in each entry information on the page size of the associated intermediate virtual address, and/or data access information, or other information.

The method 600 at 610 includes receiving and/or providing an effective address that needs translation by the system. In one or more embodiments, the received address is provided to and/or received by the translation buffer. In one or more embodiments, at 615, a look-up is performed in the translation buffer to determine if there is a matching effective address. In an embodiment, the look-up at 615 includes a comparison at 620 between each entry in the translation buffer and the effective address received and/or provided for translation to determine if the translation buffer has a matching entry. If the translation buffer in one or more embodiments has a matching entry (620: Yes), then at 622 the real address is provided to the system and/or processor. If there is not a matching entry in the address translation buffer (620: No), then at 624 the translation is otherwise obtained in the system. In an embodiment, when the translation is obtained at 624, information on the translation is loaded into the translation buffer at 628. In one or more embodiments, the effective address to real address mappings, and information on the corresponding intermediate virtual address, e.g., a portion of the bit filed of, a hash of, or a hash of a segment of the field of, the intermediate address, are loaded into an entry in the translation buffer. Other information loaded into the translation buffer can optionally include the page size.

During operation of the system and the method 600, circumstances will arise where an address translation will change and or otherwise need to be invalidated. In one or more scenarios, an intermediate virtual address will need to be invalidated. In the method 600, where the intermediate virtual address needs to be invalidated, at 625 the intermediate virtual address to be invalidated will be calculated, computed by the system and/or otherwise provided to (received by) the translation buffer. In an embodiment, the segment or portion of the bit field corresponding to the bit field used in the translation buffer for the virtual address entries will be computed, calculated, and/or otherwise provided for the intermediate virtual address to be invalidated. In an embodiment, optionally at 630, a hash of, or a hash of the bit field segment of, the intermediate virtual address to be invalidated will be computed. The hash algorithm to be used on the intermediate virtualized address to be invalidated will be the same hash algorithm used for providing the virtual address entries in the translation buffer.

At 635, a look-up is performed in the translation buffer to determine if there is a matching intermediate virtual address. That is, a comparison is performed between each entry in the translation buffer and the intermediate virtual address to be invalidated to determine at 635 if the translation buffer has a matching entry. In one or more embodiments, a comparison is made between a portion of the intermediate address to be invalidated and the entries in the translation buffer to determine at 640 whether there is a matching entry. In another aspect, a comparison is made between a portion of the bit field of the intermediate address to be invalidated and the entries in the translation buffer to determine at 640 whether there is a matching entry. In another embodiment, a comparison is made between a hash of the intermediate virtual address to be invalidated and the entries in the translation buffer to determine at 640 whether there is a matching entry. In a further embodiment, a comparison is made between a hash of a segment of the intermediate virtual address bit field and entries in the translation buffer to determine at 640 whether there is a matching entry.

If the translation buffer in one or more embodiments has a matching entry (640: Yes), then the corresponding entry in the translation buffer at 650 is invalidated. If there is no matching entry in the translation buffer (640: No), then at 655 no entry in the translation buffer is invalidated.

In FIG. 7 a flow chart of an illustrative method 700 of creating and implementing a merged address translation buffer, preferably a merged translation look-aside buffer (TLB), is disclosed having a plurality of entries mapping effective addresses to real addresses, and where the entries also include pertinent information on associated intermediate virtual addresses to facilitate invalidation of intermediate virtual addresses in the translation buffer. The translation buffer facilitates translating addresses in a faster and more efficient manner, while still facilitating and permitting invalidation of intermediate virtual addresses and entries relying on such intermediate virtual addresses.

In one or more embodiments, the method 700 of providing, and more specifically creating, and/or using, a translation buffer having direct translations of effective address to real address translations, and in one or more aspects a process-scoped translation and partition-scoped address translation in a single merged buffer, includes at 705 loading into the entries of the translation buffer translations of effective addresses to a real addresses, e.g., mappings of effective addresses to corresponding real addresses. The address translation entries loaded into the translation buffer can be obtained from a table walker or other translation mechanism, and can include loading into the merged translation buffer effective addresses and corresponding final real addresses. The entries can be merged into the address translation buffer after the address translation buffer misses on a requested translation request.

The method 700 further includes at 710 in one or more embodiments loading the translation buffer with information on an intermediate virtual address. In an aspect, the method 700 includes obtaining information on the intermediate virtual address from the process-scoped translation and/or partition-scoped translation. In one or more embodiments, each entry in the address translation buffer is loaded with intermediate virtual address information associated with and/or corresponding to the effective address to real address translation in that translation buffer entry. In an embodiment, the effective address information for the translation buffer entry is obtained from a process-scoped translation and the real address for that translation buffer entry is obtained from a partition-scoped translation, and the information loaded into that translation buffer entry is loaded from the process-scoped translation of the effective address or the partition-scoped translation of the intermediate virtual address. In one or more embodiments, one or more entries, and preferably all entries, in the translation buffer include a segment or portion of the bit field of the associated or corresponding virtual address; a hash of the associated or corresponding virtual address; or a hash of a segment or portion of the bit field of the associated or corresponding virtual address. The segment or portion of the bit field of the virtual address selected to include in, or to hash and include in, the translation buffer will depend on the implementation and the desired performance characteristics, and preferably will be optimized for the particular application. The bit field selected for the associated or corresponding virtual address can be predetermined, adjustable, and/or programmable.

The method 700 further includes at 715 in one or more embodiments loading each entry in the translation buffer with information on the page size of the associated intermediate virtual address, and/or in one or more aspects loading each entry in the translation buffer with data access information, or other information. The entry of address mappings, and other information and data into the merged address translation buffer in an embodiment can occur when there is a miss in the address translation buffer and the system looks up the translation. Other methods of loading the address mappings and other information into the entries in the address translation buffer are contemplated. In one or more embodiments, entries in the translation buffer can be replaced using a least recently used (LRU) algorithm. Other prioritization methods for replacing entries in the merged address translation buffer are contemplated.

While the illustrative embodiments described above are preferably implemented in hardware, such as in units and circuitry of a processor, various aspects of the illustrative embodiments and/or techniques may be implemented in software as well. For example, it will be understood that each block of the flowchart illustrations in FIGS. 6 and 7, and combinations of blocks in the flowchart illustration, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustration support combinations of means for performing the specified functions, combinations of steps for performing the specified functions, and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

One or more embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

The corresponding structures, materials, acts, and equivalents of all means or step plus function elements in the claims below are intended to include any structure, material, or act for performing the function in combination with other claimed elements as specifically claimed. The description of the embodiments of the present disclosure has been presented for purposes of illustration and description, but is not intended to be exhaustive or limited to the embodiments in the form disclosed. Many modifications and variations will be apparent to those of ordinary skill in the art without departing from the scope and spirit of the disclosure. The embodiments and examples were chosen and described in order to best explain the principles of the disclosure and the practical application, and to enable others of ordinary skill in the art to understand the disclosure for various embodiments with various modifications as are suited to the particular use contemplated.

The programs described herein are identified based upon the application for which they are implemented in a specific embodiment of the disclosure. However, it should be appreciated that any particular program nomenclature herein is used merely for convenience, and thus the disclosure should not be limited to use solely in any specific application identified and/or implied by such nomenclature.

It will be clear that the various features of the foregoing systems and/or methodologies may be combined in any way, creating a plurality of combinations from the descriptions presented above.

It will be further appreciated that embodiments of the present disclosure may be provided in the form of a service deployed on behalf of a customer to offer service on demand.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of translating fully virtualized addresses having two scopes of address translation comprising, by a processing system:

providing a single translation buffer having a plurality of entries, wherein each entry contains a mapping of an effective address directly to a corresponding real address and information on a corresponding intermediate virtual address, wherein the effective address is recognized and usable by a guest operating system running on a virtual processing system, and the intermediate virtual address is recognized and usable by the virtual processing system, wherein the information on a corresponding intermediate virtual address stored in each entry in the single translation buffer uses a bit field that has fewer bits than a full intermediate virtual address that is selected from the higher order virtual address bits and includes at least one of the group consisting of: a segment of the bit field of the intermediate virtual address that is less than a bit field for an intermediate page number, a hash of the intermediate virtual address, and a hash of a segment of the bit field of the intermediate virtual address;

receiving, by the single translation buffer, a first effective address for translation;

determining whether the single translation buffer has an entry with an effective address matching the first effective address;

determining, in response to determining that the single translation buffer has an entry with an effective address matching the first effective address, whether the single translation buffer entry that has the matching first effective address has a matching page size;

providing, in response to determining that the single translation buffer has an entry with both a matching effective address and a matching page size, the real address translation from the entry having the matching effective address;

determining, in response to determining that the single translation buffer does not have an entry with a matching effective address and a matching page size, the real address corresponding to the first effective address; and loading into an entry in the single translation buffer, in response to determining the real address corresponding to the first effective address, the effective address to real address mapping, the page size, and information on the corresponding intermediate virtual address.

2. The method of claim 1, further comprising receiving a first intermediate virtual address to be invalidated and determining whether an entry in the single translation buffer matches the first intermediate virtual address to be invalidated, wherein determining whether an entry in the single translation buffer matches the first intermediate virtual address to be invalidated includes determining at least one of: whether a bit field segment less than the full first intermediate virtual address to be invalidated matches a bit field segment of the intermediate virtual address stored in an entry in the single translation buffer; whether a hash of the first intermediate virtual address to be invalidated matches a hash of the intermediate address stored in an entry in the single translation buffer; or a hash of a bit field segment less than the full first intermediate virtual address to be invalidated matches a hash of the bit field segment of an intermediate virtual address stored in an entry in the single translation buffer.

3. The method of claim 2, further comprising, invalidating, in response to determining that an entry in the single translation buffer matches the first intermediate virtual address to be invalidated, the matching entry in the single translation buffer, and not invalidating, in response to determining that an entry in the single translation buffer does not match the first intermediate virtual address to be invalidated, any entry in the single translation buffer.

4. The method of claim 1, wherein entries in the single translation buffer are replaced using a least recently used (LRU) algorithm.

5. The method of claim 1, wherein the higher order virtual address bits are selected from the effective address portion (EPN) of the virtual address.

6. A computing system comprising:

a single address translation table cache having a plurality of entries for translating a fully virtualized effective address directly to a real address, wherein each entry of the single address translation table cache maps an effective address or a portion of a bit field of the fully virtualized effective address to a real address that exists in physical memory, and each entry stores information on a corresponding intermediate virtual address using a bit field that is less than the full intermediate virtual address that is selected from the higher order virtual address bits and each entry further contains at least one of the group consisting of: a segment of the bit field of the intermediate virtual address that is less than a bit field for an intermediate page number, a hash of the intermediate virtual address, and a hash of a segment of the bit field of the intermediate virtual address, wherein the fully virtualized effective address is recognizable and usable by a guest operating system running on a virtual computing system and the intermediate virtual address is recognizable and usable by the virtual computing system; and a processor;

wherein the processor is configured to:

receive a first fully virtualized effective address for translation;

determine whether the single address translation table cache has an entry having a fully virtualized effective address matching the first fully virtualized effective address;

determine, in response to determining that the single translation buffer has an entry with an effective address matching the first effective address, whether the single translation buffer entry that has the matching first effective address has a matching page size;

provide, in response to determining that the single address translation table cache has an entry with both a matching fully virtualized effective address and a matching page size, the real address translation from the entry having the matching fully virtualized effective address;

determining, in response to determining that the single translation buffer does not have an entry with a matching effective address and a matching page size, the real address corresponding to the first effective address; and loading into an entry in the single translation buffer, in response to determining the real address corresponding to the first effective address, the effective address to real address mapping, the page size, and information on the corresponding intermediate virtual address.

7. The system of claim 6, wherein the system is further configured to receive a first intermediate virtual address to be invalidated and determine whether an entry in the single address translation table cache matches the first intermediate virtual address to be invalidated, wherein determining whether an entry in the single address translation cache matches the first intermediate virtual address to be invalidated comprises determining whether: a bit field segment of the first intermediate virtual address to be invalidated matches a bit field segment of the intermediate virtual address stored in an entry in the single address translation table cache; a hash of the first intermediate virtual address to be invalidated matches a hash of the intermediate address stored in an entry in the single address translation table cache; or a hash of a segment of the first intermediate virtual address to be invalidated matches a hash of the bit field segment of an intermediate virtual address stored in an entry in the single address translation table cache.

8. The system of claim 7, wherein the system is further configured to:
invalidate, in response to determining that an entry in the single address translation table cache has an intermediate virtual address that matches the first intermediate virtual address to be invalidated, the matching entry in the single address translation table cache, and
not invalidate, in response to determining that an entry in the single address translation table cache does not have an intermediate virtual address matching the first intermediate virtual address to be invalidated, any entry in the single address translation table cache.

9. The system of claim 6, wherein the system is further configured to replace entries in the single address translation table cache using a least recently used (LRU) algorithm.

10. The system of claim 6, wherein the information on the corresponding intermediate virtual address stored in the bit field of the single address translation table cache that is selected from the higher order virtual address bits is selected from the higher order effective address portion (EPN) of the virtual address bits.

11. A computing system comprising:
a single address translation table cache having a plurality of entries, wherein each entry maps a fully virtualized effective address directly to a real address, and each entry further stores information on a corresponding intermediate virtual address using a bit field that is less than the full intermediate virtual address that is selected from the higher order virtual address bits, wherein the fully virtualized effective address is recognizable and usable on a guest operating system running on a virtual computing system and the intermediate virtual address is recognizable and usable by the virtual computing system and the information on a corresponding intermediate virtual address includes at least one of a group consisting of: a segment of the bit field of the corresponding intermediate virtual address that is less than a bit field for an intermediate page number, a hash of the corresponding intermediate virtual address, and a hash of a segment of the bit field of the intermediate address;
a processor; and
a non-transitory computer-readable storage medium comprising program instructions that when executed by the processor cause the processor to:
receive a first fully virtualized effective address for translation;
determine whether the single address translation table cache has an entry with a fully virtualized effective address matching the first fully virtualized effective address;
determine, in response to determining that the single translation buffer has an entry with an effective address matching the first effective address, whether the single translation buffer entry that has the matching first effective address has a matching page size;
provide, in response to determining that the single address translation table cache has an entry with both a matching fully virtualized effective address and a matching page size, the real address translation from the entry having the matching fully virtualized effective address;
determining, in response to determining that the single translation buffer does not have an entry with a matching effective address and a matching page size, the real address corresponding to the first effective address; and
loading into an entry in the single translation buffer, in response to determining the real address corresponding to the first effective address, the effective address to real address mapping, the page size, and information on the corresponding intermediate virtual address.

12. The system of claim 11, further comprising program instructions that when executed by the processor cause the processor to:
receive a first intermediate virtual address to be invalidated;
determine whether an entry in the single address translation table cache matches the first intermediate virtual address to be invalidated by determining whether: a bit field segment of the first intermediate virtual address to be invalidated matches a bit field segment of the intermediate virtual address stored in an entry in the single address translation table cache; a hash of the first intermediate virtual address to be invalidated matches a hash of the intermediate address stored in an entry in the single address translation table cache; or a hash of a segment of the first intermediate virtual address to be invalidated matches a hash of the bit field segment of an intermediate virtual address stored in an entry in the single address translation table cache;
invalidate, in response to determining that an entry in the single address translation table cache matches the first intermediate virtual address to be invalidated, the matching entry in the single address translation table cache; and
not invalidate, in response to determining that an entry in the translation buffer does not match the first intermediate address to be invalidated, any entry in the single address translation table cache.

13. The system of claim 11, wherein the information on the corresponding intermediate virtual address stored in the bit field of the single address translation table cache that is selected from the higher order virtual address bits is selected from the higher order effective address portion (EPN) of the virtual address bits.

* * * * *